United States Patent [19]

Gabbe et al.

[11] Patent Number: 4,928,252

[45] Date of Patent: May 22, 1990

[54] PRINTING APPARATUS AND METHOD FOR PRINTING A PLURALITY OF PAGES ONTO A SINGLE SHEET

[75] Inventors: David Gabbe, Hudson; Ned Batchelder, Brookline, both of Mass.

[73] Assignee: Digital Equipment Corporation, Maynard, Mass.

[21] Appl. No.: 159,947

[22] Filed: Feb. 24, 1988

[51] Int. Cl.$^5$ ............................................. G0 F 3/12
[52] U.S. Cl. ................................... 364/519; 364/900; 364/917.3; 364/930; 364/930.7
[58] Field of Search ............... 364/519, 200 MS File, 364/900 MS File; 400/76, 279

[56] References Cited

U.S. PATENT DOCUMENTS

| | | | |
|---|---|---|---|
| 4,441,829 | 4/1984 | Hebert, Jr. et al. | 400/63 |
| 4,445,795 | 5/1984 | Levine et al. | 400/63 |
| 4,636,872 | 1/1987 | Prichard | 364/519 X |
| 4,651,278 | 3/1987 | Herzog et al. | 364/300 |
| 4,674,040 | 6/1987 | Barker et al. | 364/300 |

OTHER PUBLICATIONS

R. F. Sproull and B. K. Reid, Introduction to Interpress, Xerox Corp., Apr. 1984, pp. 173-183.
N. Batchelder, NVP-PRE.PE; 1, 1986.

*Primary Examiner*—Gary V. Harkcom
*Assistant Examiner*—Mark K. Zimmerman
*Attorney, Agent, or Firm*—Finnegan, Henderson, Farabow, Garrett and Dunner

[57] ABSTRACT

A method and apparatus for printing multiple pages written in page description format on a single sheet. The invention prints the multiple pages onto the single sheet by dynamically fitting the pages into the usable surface area of the sheet. To achieve the best fit, the invention determines a maximum scale factor for the multiple pages printed onto the sheet. This maximum scale factor is approximated by calculating a sheet layout which occupies the greatest percentage of the usable surface area of the sheet. Additionally, the invention provides for printing multiple pages on successive sheets while allowing the user to specify that margins be located on opposite edges of alternate sheets.

12 Claims, 7 Drawing Sheets

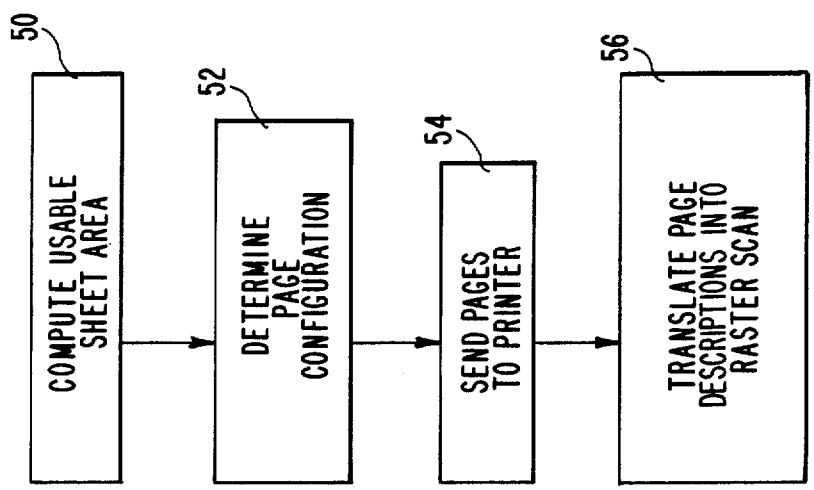
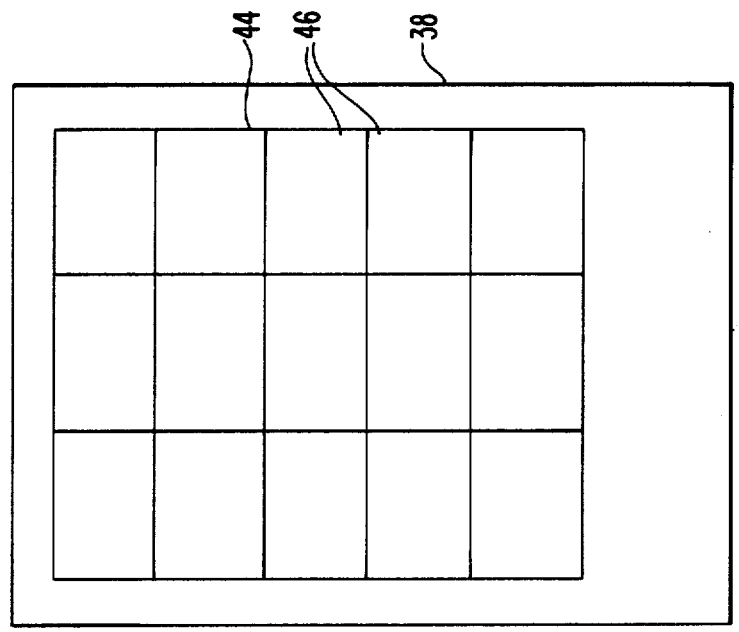

FIG. 7A
| 1 | 2 | 3 |
|---|---|---|
| 4 | 5 | 6 |
| 7 | 8 | 9 |

RIGHT DOWN (RD)

FIG. 7B
| 3 | 2 | 1 |
|---|---|---|
| 6 | 5 | 4 |
| 9 | 8 | 7 |

LEFT DOWN (LD)

FIG. 7C
| 7 | 8 | 9 |
|---|---|---|
| 4 | 5 | 6 |
| 1 | 2 | 3 |

RIGHT UP (RU)

FIG. 7D
| 9 | 8 | 7 |
|---|---|---|
| 6 | 5 | 4 |
| 3 | 2 | 1 |

LEFT UP (LU)

FIG. 7E
| 1 | 4 | 7 |
|---|---|---|
| 2 | 5 | 8 |
| 3 | 6 | 9 |

DOWN RIGHT (DR)

FIG. 7F
| 7 | 4 | 1 |
|---|---|---|
| 8 | 5 | 2 |
| 9 | 6 | 3 |

DOWN LEFT (DL)

FIG. 7G
| 3 | 6 | 9 |
|---|---|---|
| 2 | 5 | 8 |
| 1 | 4 | 7 |

UP RIGHT (UR)

FIG. 7H
| 9 | 6 | 3 |
|---|---|---|
| 8 | 5 | 2 |
| 7 | 4 | 1 |

UP LEFT (UL)

FIG. 7I
| 1 | 2 | 3 |
|---|---|---|
| 4 | 5 | 6 |
| 7 | 8 | 9 |

RIGHT DOWN (RD)

FIG. 7J
| 3 | 2 | 1 |
|---|---|---|
| 6 | 5 | 4 |
| 9 | 8 | 7 |

LEFT DOWN (LD)

FIG. 7K
| 7 | 8 | 9 |
|---|---|---|
| 4 | 5 | 6 |
| 1 | 2 | 3 |

RIGHT UP (RU)

FIG. 7L
| 9 | 8 | 7 |
|---|---|---|
| 6 | 5 | 4 |
| 3 | 2 | 1 |

LEFT UP (LU)

FIG. 7M
| 1 | 4 | 7 |
|---|---|---|
| 2 | 5 | 8 |
| 3 | 6 | 9 |

DOWN RIGHT (DR)

FIG. 7N
| 7 | 4 | 1 |
|---|---|---|
| 8 | 5 | 2 |
| 9 | 6 | 3 |

DOWN LEFT (DL)

FIG. 7O
| 3 | 6 | 9 |
|---|---|---|
| 2 | 5 | 8 |
| 1 | 4 | 7 |

UP RIGHT (UR)

FIG. 7P
| 9 | 6 | 3 |
|---|---|---|
| 8 | 5 | 2 |
| 7 | 4 | 1 |

UP LEFT (UL)

PRINTING APPARATUS AND METHOD FOR PRINTING A PLURALITY OF PAGES ONTO A SINGLE SHEET

BACKGROUND OF THE INVENTION

This invention relates generally to the field of printer control and, more particularly, to printer control in which multiple pages are printed on a sheet.

Prior to the introduction of laser printers, printing document files generated by computer was relatively simple using contact printing. Contact printers support a character set having a fixed number of characters. The slow speed with which the conventional dot matrix or contact printers provided output information made high-speed communication with the printers unnecessary.

High-speed laser printers print photographic quality images by methods such as raster scanning by making use of a high-resolution printing technique known as bit mapping. A bit map for a graphics image comprises a two dimensional array of data known as picture elements, or pixels, which constitute the image. In order to print an image, the print engine of a laser printer must receive a large amount of data corresponding to a bit map for each image produced.

Laser printing exposed major flaws in other slow methods of outputting print information. That is, programs which output documents or files to be printed conventionally generate all the information for the print engine to use in printing out the image. This requires the generation of large amounts of data in order to transmit every pixel in the bit map for the image. The large quantity of information being transferred consumes a large portion of the resources of small computer systems and requires high-capacity communication links between the computer and the terminal. These features of laser printers result in the inefficient use of the potential output capacity of laser printers.

Typical page description languages ease the problem of generating images for output on a laser printer and prevent the overloading of computer systems and communications networks utilizing a laser printer. Page description languages allow the computer system to express an image of a page of information in a minimal amount of storage space.

Examples of application programs which generate page descriptions are word processors, illustrators, and computer aided design systems. Such an application program, as opposed to generating an output consisting of a complete bit map of the image to be printed out, generates an executable program consisting of instructions in the page description language to be sent to the printer. The instructions are executed at the printer to produce the page image.

The executable program written in the page description language consists of instructions interpreted by the printer for generation of raster scan or other bit map information usable by the print engine for generating the image. For example, in order to print a portion of text on a page, the application program generates instructions in page description language specifying the shape of the letters (i.e. the font), the size, the position, and the individual character designations. The laser printer uses these text parameters to generate a raster scan image of the specified text.

If graphic information is printed out, the application program specifies in page description language the boundaries of each image and specifies how the boundries are to be filled in, as opposed to specifying each individual pixel to be generated by the laser printer.

A variety of page description languages are conventionally used, including the PostScript® language published by Adobe Systems' Inc. and Interpress published by the Xerox Corporation.

The principal advantage of page description languages is the elimination of unwieldy pixel arrays which are difficult to manipulate or create for smaller systems running application programs.

Moreover, pixel arrays are usually generated for a particular printer device and therefore are device dependent. Utilization of a page description language enables an application program to provide output to a variety of laser printers without modifying the format of the data provided as output. The application program simply generates the same page description program regardless of the printer included in the computer system.

Laser printers equipped to utilize page description languages include an interpreter and a print engine. The interpreter is software which receives the page description language generated by the application program and reduces the high level page description language to a low level raster data format usable as input by the specific print engine. The interpreter is designed to translate any program written in a page description language into output data, which may be processed by the print engine or output device.

Desktop publishing consists of producing high quality documents that have a type set appearance utilizing a small computer system. In desktop publishing, printing is done by a laser an image through contact printing. Desktop publishing systems are one example of an application program taking advantage of page description languages. In desktop publishing, textual material and graphics may be combined into the same document on the same pages. However, once each page is defined, most desktop publishing systems do not allow for modification by printing out pages in altered formats to accommodate different document styles. For example, once a document has been formatted so that the pages print out one page to a sheet, there is usually no facility to change to a system where two pages may be printed on one sheet to conserve paper and facilitate binding.

Desktop publishing systems such as PageMaker by Aldus Corporation allow a user to construct sheets to be printed out having more than one page on the sheet. However, this formatting must be done while the document is being produced. Once the document is formatted in this manner, there is no provision to alter the output format.

In the prior art, there are simple programs written in page description languages enabling a user to print out more than one page on a single sheet without revising the entire document. These programs allow the user to print a predetermined number of pages on a single sheet. This capability of printing multiple pages onto a single sheet is referred to as "number-up" of pages. The page description programs offering "number-up" capability generally offer only the choice of printing certain combinations of pages onto a sheet such as two, four, or eight pages. Additionally, such programs lack the flexibility to adapt the program to randomly selected sizes of pages and sheets.

Therefore it is desirable to provide a method and apparatus which allows a user to print any desired combination of pages onto a sheet.

SUMMARY OF THE INVENTION

Objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a method for printing a predetermined number of pages on a single sheet, wherein each of the pages is represented by a page description specifying the configuration of a page to be printed; comprises the steps of computing the area on the sheet available for printing; selecting a test number of pages equal to the predetermined number of pages; determining a plurality of grid configurations, each of the configurations defining a given number of grid areas for printing pages therein, the given number of grid areas having a value equal to the test number of pages; calculating scale factors to establish the size of a page to be printed from one of said page descriptions as the size of one of the grid areas in each of the plurality of grid configurations; determining the grid configuration having the largest scale factor; calculating, using the grid configuration having the largest scale factor, the percent surface area of the sheet covered by a number of grid areas equal to the test number of pages; comparing the percent surface area to a predetermined percentage; incrementing the test number of pages; and repeating the steps of determining a plurality of grid configurations, calculating a scale factor, determining the grid configuration having the largest scale factor, calculating percent surface area, and comparing the percent surface area covered to the predetermined percentage, the incrementing and repeating step being conditioned on the percent surface area having a value less than the predetermined percentage; and printing, in response to the percent surface area having a value equal to or greater than the predetermined percentage, the predetermined number of pages on the sheet using the largest scale factor.

In another aspect of the invention, to achieve the objects and in accordance with the purpose of the invention, as embodied and broadly described herein, an apparatus for printing a plurality of pages on a single sheet comprises means for generating pages in the page description format; means for transmitting a print request; means responsive to the print request for printing the pages on a sheet; means for scheduling the transmitted print request; means for storing the pages in response to the generating means; means for determining a plurality of grid configurations, each of the grid configurations defining a plurality of grid areas for printing pages therein, for calculating scale factors to establish the size of a page to be printed from one of the page descriptions to fit in one of the grid areas and each of the plurality of grid configurations, and for determining one of the plurality of grid configurations having a percent coverage of the sheet surface area greater than a predetermined percentage; means for generating instructions for printing out the plurality of pages in corresponding grid areas of the grid configuration having a percent coverage of the sheet surface area greater than a predetermined percentage; and the printing means including means for interpreting the instructions and for printing the plurality of pages on the single sheet in response to the interpreting means.

The accompanying drawings, which are incorporated in and constitute a part of this specification, illustrate one embodiment of the invention, and, together with the description, serve to explain the principles of the invention.

BRIEF DESCRIPTION OF THE DRAWINGS

FIGS. 2A, 2B and 2C illustrate progressive stages in determining grid configurations in accordance with the operation of the preferred embodiment;

FIG. 3 is a logic flow diagram of the overall operation of the preferred embodiment;

FIGS. 7A-7P illustrate various sequences of pages in both portrait and landscape orientation on a sheet in the preferred embodiment of the present invention.

DESCRIPTION OF THE PREFERRED EMBODIMENT

Figure 1:
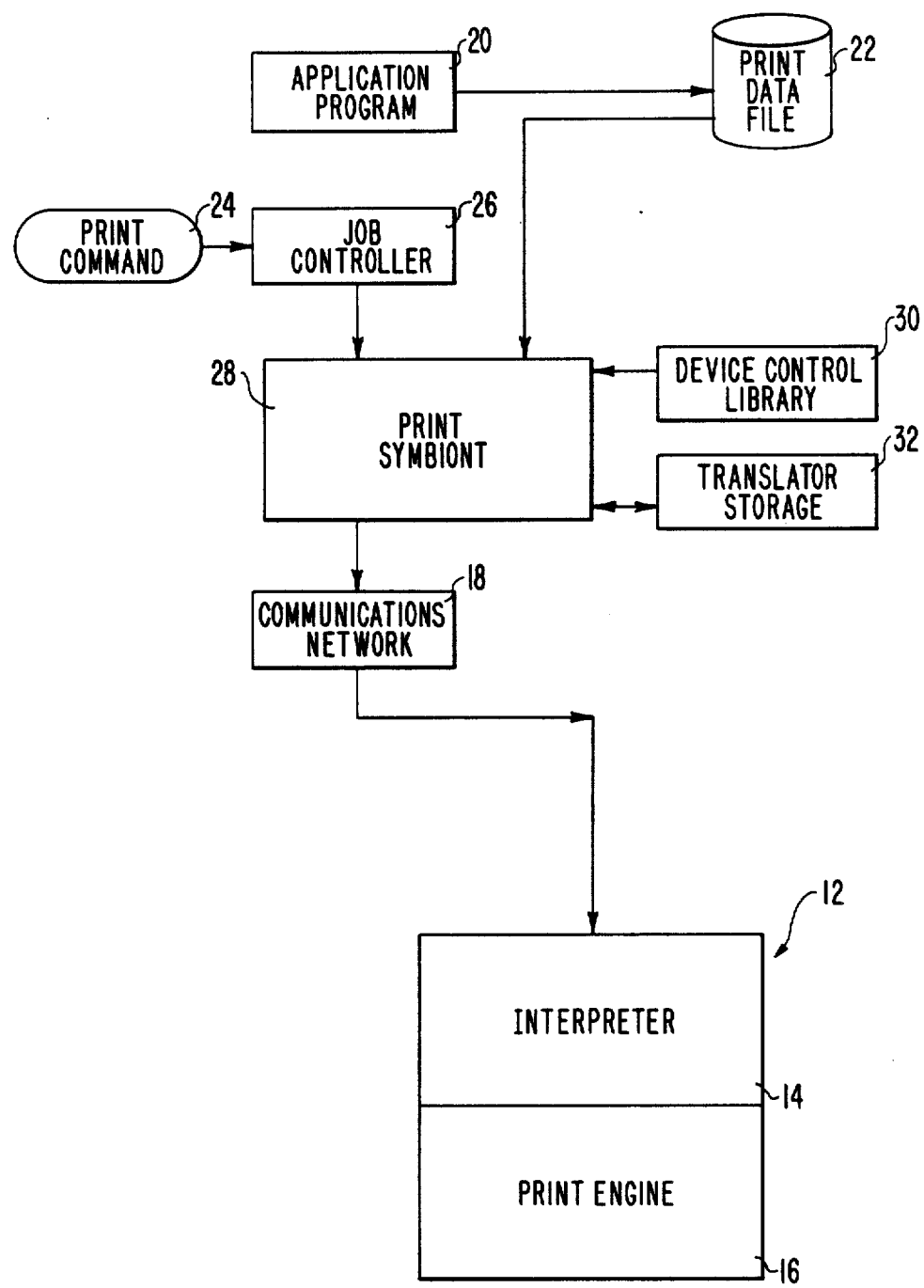
FIG. 1 is a diagram of a system which illustrates the general operating environment of a preferred embodiment of the present invention.

Reference will now be made in detail to the present preferred embodiment of the invention, an example of which is illustrated in the accompanying drawings. In the drawings like reference characters refer to like elements. FIG. 1 illustrates the general operating environment of a preferred embodiment of the present invention. A computer system 10 is coupled to a printer 12 which is comprised of an interpreter 14 and a print engine 16. The link between computer system 10 and printer 12 may be via an intervening communications network 18 shared with similar computer systems.

The invention includes means for generating pages in a page description format. In the preferred embodiment, the page generation means comprises elements of computer system 10, including an application program 20, a print data storage unit 22, a print command receptor 24, a job controller 26, a print symbiont 28, a device control library 30, and translators 32.

Application program 20 produces data files to be printed which consist of one or more pages. In the preferred embodiment such pages can consist of any conventional output format such as ANSI files, ReGIS graphics, or output for graphic terminals such as Tektronix type 4010/4014 devices. For efficient utilization of capabilities of printer 12, application program 20 should output the data files in any well-known page description language. In the preferred embodiment the page description language output by application program 20 is the same page description language utilized by printer 12 so no translation is necessary.

A page description language produces page descriptions which, when received by the printer, are transformed into a bit map graphics image. Page descriptions are executable programs written in the page description language being utilized. The result of execution of a page description is a bit map graphics image which is submitted to the print engine in an appropriate form for printing on a sheet. Interpreter 14 executes the page descriptions provided to printer 12. Preferably, print engine 16 is a raster scan type laser printer. Therefore, the output of interpreter 14 will be in raster scan format.

Print command receptor 24 is comprised of a terminal or other interrupt device for sending a print request to job controller 26. Print command receptor 24 transmits a print request to the job controller 26. A user may enter a print request at a terminal or an interrupt may be entered automatically through application program 20 with a print request. The print request consists of an instruction to print a specified file along with parameters controlling certain aspects of the printing process and acting as variables for storing information in the preferred embodiment.

Job controller 26 schedules and processes print requests for print symbiont 28. Print symbiont 28 is a component of computer system 10 which is responsible for manipulating the print files, translators and device control modules for transmission to the printer 12. In the preferred embodiment, the print symbiont transmits print files written in a page description language such as PostScript ® by Adobe. These files should consist of page descriptions written in a page description language utilized by printer 12.

The PostScript ® Language Reference Manual by Adobe Systems Inc., copyrighted in 1986, and the Postscript ® Language Tutorial and Cookbook by Adobe Systems, Inc., copyrighted in 1986 are hereby incorporated by reference for a more detailed understanding of the page description language utilized in the preferred embodiment.

When a file to be printed is stored in print data storage unit 22 in a format other than a page description written in a page description language, an appropriate translator module is downloaded from translator storage 32 into print symbiont 28. Print symbiont 28 then transmits the translator module to interpreter 14 to translate the print data file into page descriptions in a page description language.

When interpreter 14 has translated the data file into a series of page descriptions written in a page description language, print symbiont 28 implements any functions specified by the print request transmitted by print command receptor 24. That is, print symbiont 28 prepares print files and device control modules to be transmitted to printer 12 so that the output specified by the print request is produced by printer 12. For example, the print request selects a specific size of paper on which the pages should be printed. In order to implement the functions specified by the print request print symbiont 28 downloads modules from device control library 30 and sends them to interpreter 14. The modules contain the necessary commands for printer 12 to select Initially, a user submits a print request which includes an instruction to print multiple pages stored in print data storage unit 22 onto a single sheet of paper. Normally, only one page will be printed on a single sheet generated as output by the printer. The instruction to print multiple pages is entered into the print request by specifying the parameter, or variable, referred to as "number-up".

The parameters set in the print request define the output produced by printer 12. When specifying the "number-up" parameter the user may include other parameters which modify the processing of the "number-up" parameter. If "number-up" is specified without any additional parameters which modify "number-up", print symbiont 28 will dynamically fit the number of pages specified by the "number-up" parameter on a sheet. The preferred embodiment of the present invention insures that a certain threshold percentage value of sheet coverage is obtained by the dynamic page fitting algorithm. Preferably, additional parameters may be specified such as the ability to alternate margins between opposite edges of the sheet surface area for successive sheets. This enables, for example, the user to provide room for binding each of the sheets so that they face each other.

The number of pages printed out on the sheet will be equal to the "number-up" specified by the user unless the user specifies the last page to be printed on a sheet. If the last page or the first page is specified, then a number of pages less than the parameter "number-up" will be printed. In this case, blanks will be left on the sheet where pages could be placed.

A page is an indivisible image of a portion of a document. When the document is generated, each page is intended to be printed on a separate piece of paper. As used herein, a page refers to the amount of data designated by the application program to be printed on a single sheet of paper.

As defined herein, a sheet refers to a piece of paper or print surface onto which print engine 16 prints an image or images. A sheet is normally considered to be one piece of paper output by printer 12.

In the present invention, the user may override the default setting of printing a single page onto a single sheet; and instead, print a multiple number of existing pages onto a single sheet. Conventional applications for this feature include printing two pages onto a single sheet wherein these pages are facing pages from a document. Thus, a document which was originally generated by the application program to occupy a given number of sheets equal to the number of pages may be printed according to the present invention with half as much paper by printing two pages to a sheet. This capability does not require any modification of the document.

The present invention is not limited to a few predefined combinations of pages per sheet and/or respective sizes of pages and sheets. That is, the present invention only requires that the user specify the number of pages per sheet, after which, the method and apparatus will specify a page layout maximizing the usable area on the sheet and the size of the pages printed onto the sheet, i.e., maximize the scale factor used to print the page from the data file onto the sheet. Preferably, the present invention does not alter the aspect ratio of the pages.

Figure 2A:
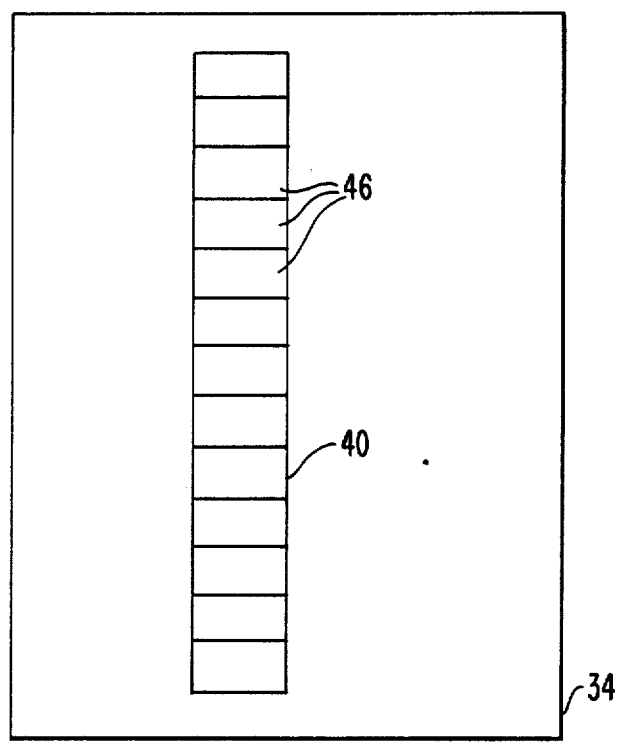
Figure 2B:
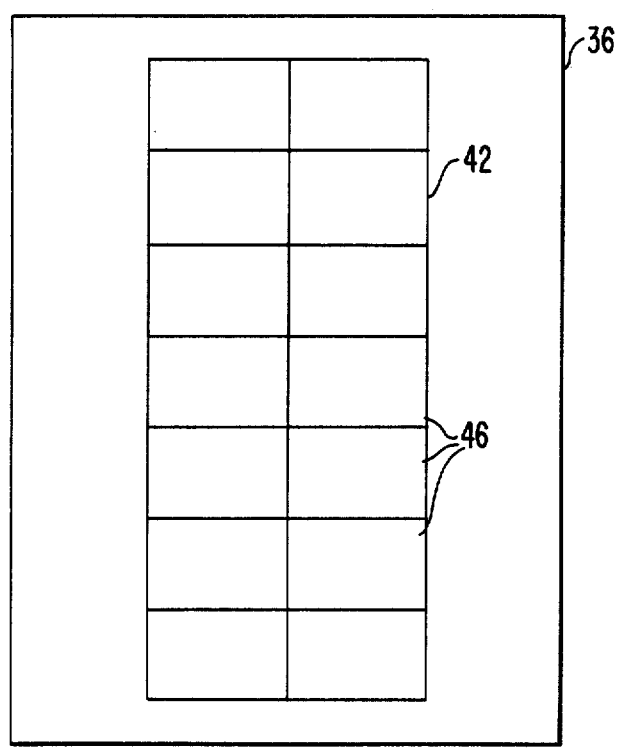

FIGS. 2A, 2B and 2C illustrate progressive stages in the operation of the preferred embodiment of the present invention. In this example, a user has specified within the print request that the parameter "number-up" is equal to 13. No other features have been specified in the print request for this example.

In FIGS. 2A, 2B and 2C, sheets 34, 36 and 38, respectively, are shown with sample grid configurations 40, 42 and 44. Grid configurations 40, 42 and 44 define grid areas 46 of equal size within respective grid configurations 40, 42, and 46 but each grid configuration 40, 42 and 46 has different size grid areas from the other grid configurations 40, 42 and 46. Pages are scaled and printed in each of the gird areas 46.

Sheet 34 illustrates the situation where an attempt is made to fit 13 pages onto a single sheet. Grid 40 is defined by the factors 1 and 13 which is the only factorization of 13. These factors represent the horizontal and vertical number of grid areas 46.

Sheet 34 (FIG. 2A) has a large amount of unused available surface area for printing, i.e., for letter sized pages and sheet the percent of the surface area covered is 13.3%. By utilizing a grid configuration 42 (see FIG. 2B) defined by the factors 2 and 7, a grid configuration 42 is achieved in which pages may be printed into grid areas 46 of grid configuration 42 of FIG. 2B. The scale factor used to scale the pages to fit into grid areas 46 of grid configuration 42 is equal to 0.168 and is larger than the scale factor, 0.090, necessary to fit pages into grid areas 46 of FIG. 2A in grid configuration 40. Moreover, a substantially greater percentage of the surface area of sheet 36 is covered, 49.3%, by grid configuration 42 than by grid configuration 40 of sheet 34 of FIG. 2A.

An even greater percentage of sheet surface area may be covered by a grid configuration having the dimensions 3×5 as is the case with grid configuration 44 on sheet 38 (see FIG. 2C). Moreover, grid configuration 44 utilizes a larger scale factor, 0.227, and covers more of the surface area of sheet 38, 96.6%, than grid configuration 42 of FIG. 2B.

Therefore, the result of the print request specifying the parameter "number-up" in the current example would be the grid configuration 44 printed on sheet 38. Given that no other parameters have been specified, the default setting for the present invention is preferably to print 13 pages within the 15 grid areas 46 of FIG. 2C. In this example, if the user sets the parameters "pages-per-sheet" or "first-page-on-sheet", even fewer pages will be printed corresponding to the parameter "pages-per-sheet" and more than two of the grid areas will be left blank.

As illustrated by the flow diagram of FIG. 3, the first step, according to a preferred embodiment of the invention, is computing the area on the sheet available for printing (step 50). Preferably, in order to calculate the area available for printing on the sheet, the area occupied by the margins is subtracted from the total sheet area. These margins may be set by the user so that one is larger than the other to accommodate binding or holes punched in one edge of a sheet. Additionally, some margin is necessary if the manufacturer of printer 12 recommends that the entire sheet area is not printed upon by print engine 16. The user may also designate the wider margin provided to accommodate for binding or holes being punched alternate edges between sheets, however, this capability does not influence the computation of available area for printing on the sheet.

The broad steps to be followed in producing a sheet having a plurality of pages printed thereon include determining the page configuration (step 52). Once the page configuration on the sheet has been defined (step 52), the pages are sent to printer 12 (step 54). Interpreter 14 then translates the page descriptions into raster scan data for print engine 16 (step 56).

In order to invoke the present invention, a print request is given through print command receptor 24 to job controller 26. Job controller 26 schedules when the print request will be performed by print symbiont 28. The print request includes parameters such as the "number-up" or number of pages which should be printed on the single sheet. Alternatively, the user can specify a specific grid configuration, such as, any one of the grid configurations of FIGS. 2A, 2B and 2C, for example, for printing the pages onto the sheet.

Figure 4:
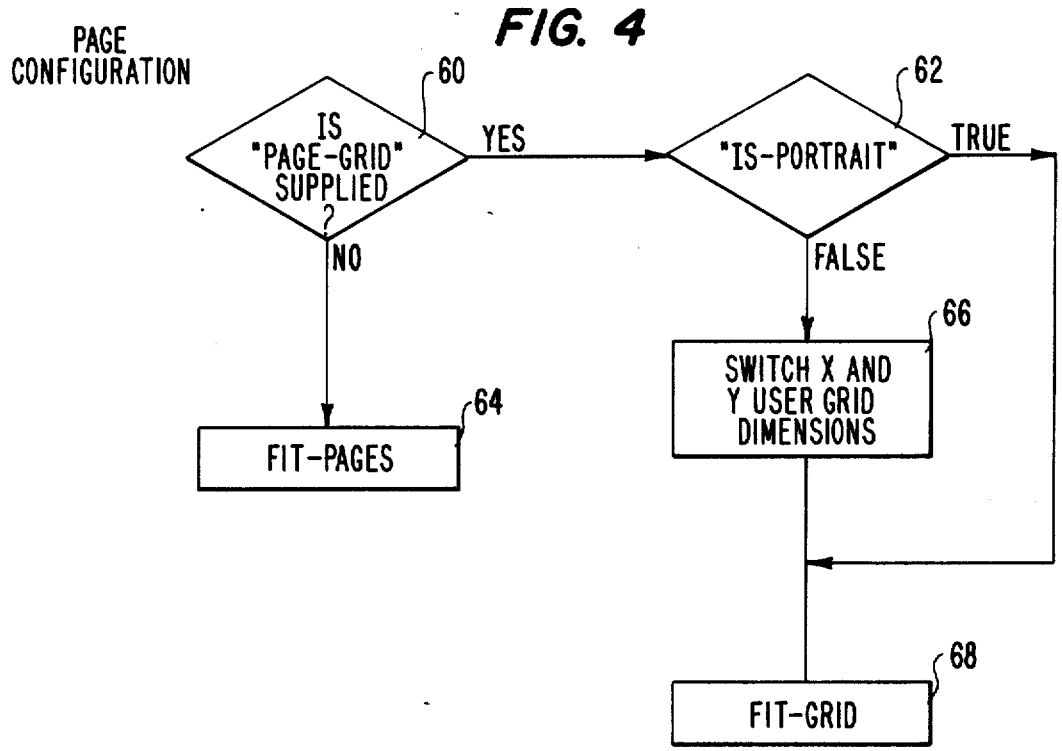
FIG. 4 is a general flow diagram of the steps for determining the page configuration in the preferred embodiment.

The first level of decision in determining the page configuration (step 52) comprises determining if the parameter "pagegrid" has been specified in the print request (step 60, as illustrated in FIG. 4). If the user has specified the grid configuration, the procedure fit-grid is implemented (step 68) as shown in detail in FIG. 5. If the user has not supplied the grid configuration which will define how the pages are printed onto the sheet, the procedure fit-pages will be implemented (step 64) as shown in detail in FIGS. 6A and 6B.

Before implementing the procedure fit-grid (step 68) the boolean variable "is-portrait" is checked to see if it is true or false. Portrait orientation is defined so the X coordinate or dimension of the page coordinate system is parallel to the short edge of the page, the Y coordinate is parallel to the long edge of the page and the origin is at the bottom left-hand corner of the page. Landscape orientation is defined so the Y coordinate of the page is parallel to the short edge of the page, the X coordinate is parallel to the long edge and the origin is at the bottom left-hand corner. If the pages are not to be printed in portrait fashion but rather in landscape orientation, the grid dimensions specified by the print request are switched (step 66).

The basic purpose of the fit-grid procedure, according to the present invention, is calculation of scale factors to establish the size of a page to be printed from one of the page descriptions as the size of one of the grid areas in a grid configuration. Preferably, the procedure fit-grid calculates a scale factor for the full size grid configuration oriented in the same way as the sheet.

Figure 5:
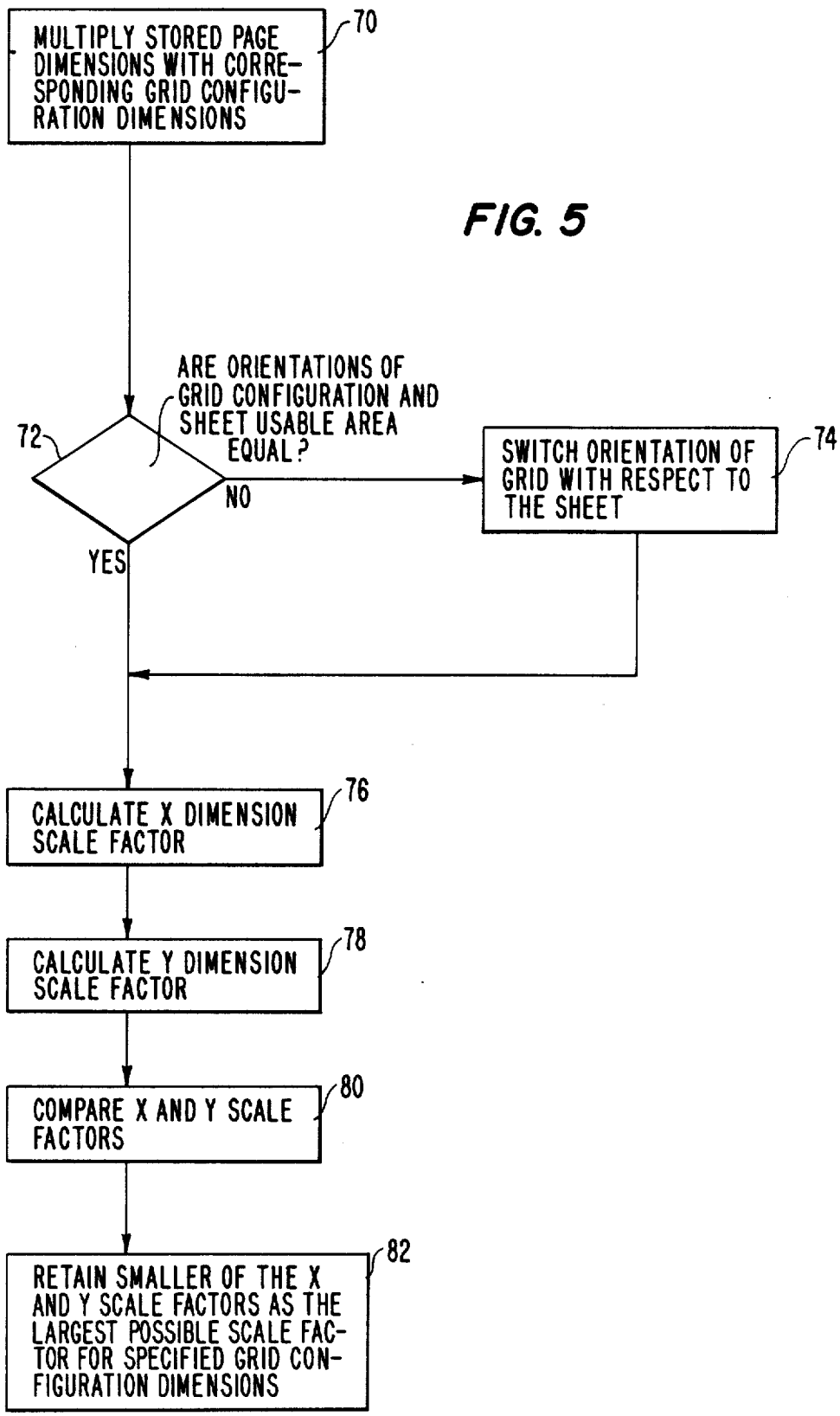
FIG. 5 is a more detailed flow diagram of the fit-grid procedure block of FIG. 4.

As illustrated in FIG. 5, the first step in the procedure fit-grid is to multiply the stored page description page dimensions with the corresponding grid configuration dimensions (step 70). These products (step 70) are equal to the dimensions of the grid configuration being considered by fit-grid having grid areas with full sized pages therein.

The orientations of the resultant grid configuration and the usable sheet area are then compared to determine if they are the same (step 72). Step 72 consists of comparing the aspect ratios. That is, the aspect ratio of the length and width of the grid configuration with full-size pages is compared to the aspect ratio of the usable area of the sheet. If the longest dimension of the grid configuration with full-size pages is parallel to the longest dimension of the sheet, i.e., their lengths are parallel, then the grid configuration with full-size pages and usable area of the sheet are oriented the same way. If the X coordinate dimension of the result of the multiplication of the grid configuration dimension with the page description page dimension is greater than the corresponding Y dimension product from step 70 and the X coordinate dimension of usable sheet area and Y coordinate dimension of the usable sheet area share the same relationship (step 72) then the orientations are the same. If the orientations are not the same, i.e., aspect ratios are not equivalent, then the orientation of the grid should be switched so that its longest dimension corresponds to the longest dimension of the usable sheet area (step 74). Preferably, when the grid orientation is switched a boolean variable, "switched", should be set.

After the orientations of the grid configuration with fullsize pages and usable sheet area are matched up through comparison of aspect ratios, the scale factors for the corresponding dimensions of the scaled up page, calculated in step 70, are determined in steps 76 and 78. This requires that the corresponding dimension of the sheet area be divided by the corresponding dimension of the scaled up grid configuration from step 70 or, if switched, from step 74. Therefore, the scale factor is calculated for the dimensions in the X direction and the dimensions and the Y direction.

The minimum of the X and Y scale factors from steps 76 and 78 are retained and compared (step 80). This comparison gives the largest usable scale factor for pages which are to be fit into the current specified grid configuration.

The smallest scale factor indicates the largest possible scale factor for the specified grid configuration dimensions (step 82). This scale factor is retained as the result of the fit-grid procedure. Utilization of a scale factor larger than the minimum scale factor for one of the dimensions would result in the dimension having the smallest scale factor fall outside the usable area of the sheet. That is, the dimension having the smallest scale factor would be scaled up beyond what was calculated in the fit-grid procedure steps 70 through 78 as being the appropriate scale factor for a page in the specified grid configuration.

Referring to FIG. 3, if a user specifies a grid configuration the step of determining the page configuration (step 52) is complete after the fit-grid procedure is implemented.

Figure 6B:
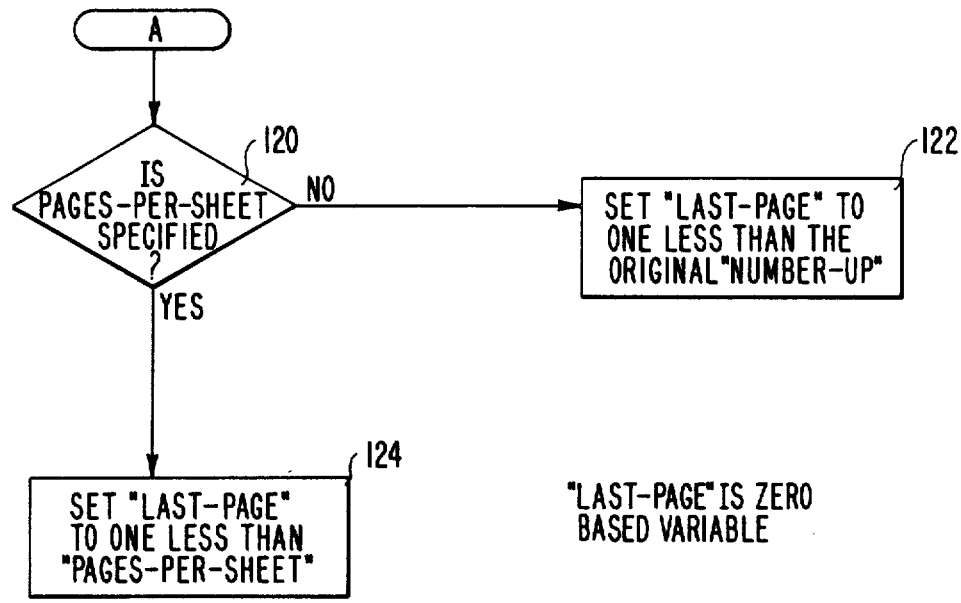
FIGS. 6A and 6B, when placed one above the other, are a flow diagram of the fit-pages procedure block of FIG. 4.
Figure 6A:
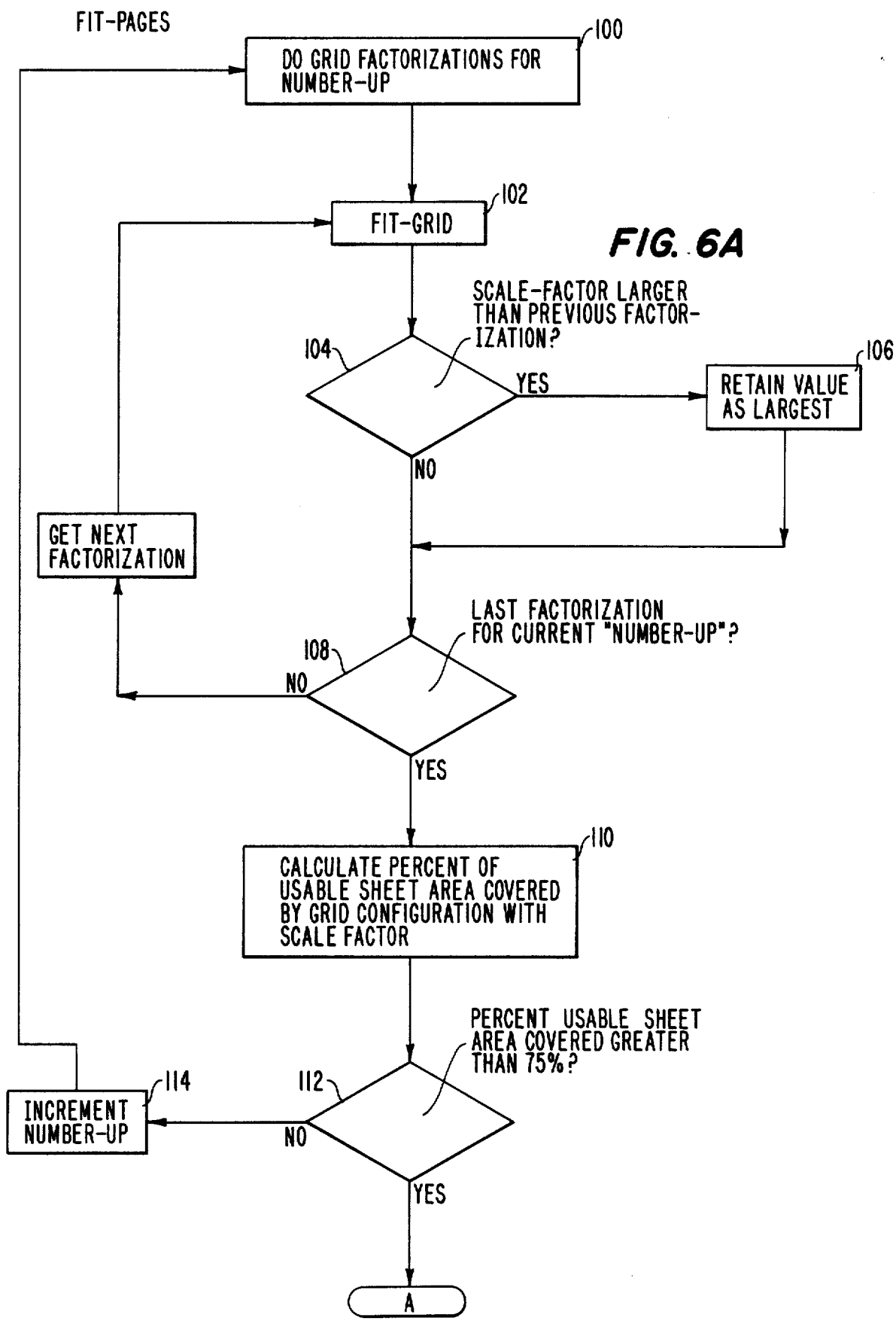

As illustrated in FIG. 4, if the user has not supplied a grid configuration (step 60), the procedure fit-pages is implemented (step 64). The procedure fit-pages is illustrated in FIG. 6A and 6B. The procedure fit pages is a dynamic page fitting process which utilizes the procedure fit-grid to determine scale factors within the fit-pages procedure.

According to the invention, the variable "number-up" is set by the user in the print request to indicate the number of pages which the user wishes to print on the sheet. In the print request the user may specify less than the "number-up" number of pages are printed on the sheet. That is, in the print request the user may specify the number of pages per sheet so remaining grid areas are left blank at least up to the "number-up". Also, a parameter in the print request can be set to start printing in a grid area other than the first, leaving the preceeding grid areas blank. In the preferred embodiment both parameters for the pages per sheet and the first page printed may operate with a specified grid configuration.

The variable "number-up" is used in the preferred embodiment of the present invention as a test number of pages which is equal to the predetermined number of pages to be printed on the single sheet. During the dynamic page fitting process "number-up" may be incremented to achieve a better fit of pages on the sheet, but only the number of pages specified originally will be printed.

The first step of the fit pages procedure according to the preferred embodiment of the present invention is determining a plurality of grid configurations, each of the configurations defining a given number of grid areas for printing pages therein, the given number of grid areas having a value equal to the test number of pages. Preferably, pairs of non-negative whole number factors for the test number held in the variable "number-up" define the plurality of grid congigurations. That is, these pairs of factors specify the dimensions of the grid configuration wherein one of the factors specifies the number of grid areas along one edge of the grid configuration, and the other factor specifies the number of grid areas along an adjacent edge.

Once the factors defining the grid configuration have been calculated (step 100), the fit-grid procedure is implemented in accordance with the invention for calculating scale factors to establish the size of a page to be printed from one of the page descriptions as the size of one of the grid areas in each of the plurality of grid configurations. In the preferred embodiment of the invention, the calculation of scale factors requires implementing fit-grid for each pair of factors and then comparing the most recently obtained scale factor from fit-grid to the scale factor retained as the currently largest scale factor in the fitpage procedure (steps 104 and 106). The process of implementing the fit grid procedure for the factorizations of the current test number of pages defined by the parameter "number-up" is continued until the last factorization is reached for the current test number of pages (steps 108 and 109).

According to the preferred embodiment of the invention, the next step is calculating, using the grid configuration having the largest scale factor, the percent surface area of the sheet covered by a number of grid areas equal to the test number of pages. Preferably, the grid configuration having the largest scale factor is retained from steps 102–109 for calculation of the percent surface area covered.

The resultant percent surface area covered is then used, in accordance with the invention, for comparing the percent surface area to a predetermined percentage. In the preferred embodiment, the percent of available sheet area covered by the grid configuration with the largest scale factor for the current test number of pages should be greater than 75% for effective use of the sheet surface area (step 112).

The cutoff of 75% is an empirical value, determined by studying best fits for grids of different sizes. It seems to be a good tradeoff between the desire for the absolute best fit, and the need for fast execution. Making the value lower would result in finding fits faster, but they would not be as good. Making the value higher would result in better fits, but would take longer to find them.

Accordingly, on condition that the percent surface area has a value less than the predetermined percentage, the steps of incrementing the test number of pages and repeating the steps of determining a plurality of grid configurations, calculating scale factors, determine the grid configuration having larger scale factor, calculating the percent surface area, and comparing the percent surface area covered to the predetermined percentage are performed. In the preferred embodiment, steps 100–114 will be implemented until the percent available sheet area covered by the grid configuration having the largest scale factor for the current test number stored in "number-up" is greater than or equal to a predetermined percentage, which preferably is 75% (step 112).

As discussed previously, the user has the option of specifying a number of pages printed on a single sheet less than the number of pages originally specified in the print request. As illustrated in FIG. 6B, the user specifies this feature by setting the parameter "pages-per-sheet" in the print request to the desired number of pages per sheet (step 120). When this parameter is not specified in the print request, the default setting is to set the variable "last-page" to one less than the parameter "number-up" from the print request (step 122). Hence the number of pages equal to the parameter "pages-per-sheet" are printed into corresponding grid areas, (one page per grid area), defined by the grid configuration having the largest scale factor (step 124) (the variable "last-page" is decremented because it is a zero based variable).

Referring to FIGS. 7A-7P, in the preferred embodiment, there are eight different page sequences or orders for each orientation (portrait or landscape) that can be specified. Each has a primary scan direction indicated by solid arrows and a secondary scan direction indicated by dashed arrows. Each direction must be either up, down, right or left, and perpendicular to each other.

The page sequence or order manipulations in the preferred embodiment of the present invention are based on the observation that one of the two scan directions must be horizontal (left or right), and one must be vertical (up or down). The resultant eight different page orders are characterized by three boolean values which are assigned to individual variables. The first variable ("down-present?") is true if the vertical direction is down rather than up. The second variable ("right-present?") is true if the horizontal direction is right rather than left. The third variable ("rl-first?") is true if the primary or first scan direction is the horizontal direction.

Initially, an integer between 0 and 7 is assigned to each page order. The selected integer is the value of the three booleans packed together so that the one's bit represents "down-present?", the two's bit represents "right-present?", and the four's bit represents "rl-first?". The two letter combination passed via the procedure set-page-order and searched for it in a string used as a table. The string contains the eight two letter combinations corresponding to the eight page orders or sequences, each followed by a value. The value portion of the string immediately following the two letter combination is the value desired for designating the page order. This value is located, read, and assigned to the variable "page-order-bits" which is comprised of the three boolean values.

The sheet coordinate system is the default page description language coordinate system for the paper, i.e., the coordinate system in which layup is invoked. Its origin is at the lower left corner of the paper, and its units are points (1/72 inch) This coordinate system is used to describe things that relate to the paper, such as sheet margins, margin alternation, etc.

The page coordinate system is the coordinate system in effect when the page begins execution. It may be oriented differently than the sheet coordinate system, and will almost certainly have different units. This coordinate system is the system in which the document is executed, and is used to describe things that relate to the page.

The reader's coordinate system is not really a mathematical coordinate system at all in that it is used for specifying directions like up and down, but has no origin and no units, since no distances are ever measured in it. If the paper is held so that the material printed on it is right-side up, then the reader's coordinate system's up direction points up, and the right direction points right. This coordinate system is used to describe things that relate to the user's perception of up and down, such as the page ordering. The reader's coordinate system can vary from the page coordinate system when landscape printing is being used.

The directions specified for the page order or sequence are relative to the reader's coordinate system. In some circumstances, the reader's coordinate is rotated by 90 degrees from the sheet's, i.e., the reader holds the left edge of the sheet at the top. In order to properly interpret the specified page sequence directions, they must be converted to be relative to the sheet's coordinate system, since the preferred embodiment of the present invention is based in the sheet's system.

The sheet's coordinate system will be different from the reader's if either the pages are landscape, or the pages' coordinates are rotated from the sheet's, but not both (they cancel each other out if both are true). It is determined if this condition holds (by examining "switched?" from the fit-grid procedure and "is-portrait?"), and if it does, small array is used as a table to convert our current "page-order-bits" into a rotated value. Now the directions are relative to the sheet's coordinate system.

Once the proper directions have been determined for the page order, the bits are split up into individual boolean values by masking each bit in turn These values will be used later when the translations are determined for each grid area.

At this point, the dynamic page fitting process as described in connection with FIG. 6, has specified the layout of pages on the sheet by determining a scale factor and the orientation of the page in the grid configuration chosen. Accordingly, the next step, is printing, in response to the percent surface area having a value equal to or greater than the predetermined percentage, the predetermined number of pages on the sheet using the largest scale factor. Preferably, interpreter 14 in printer 12 has a transformation matrix which transforms the users coordinate system, defined by the page description language, into a coordinate system specific to print engine 16.

This transformation matrix transforms the page coordinate system into the device or printer coordinate system. Thus the position of a page on a sheet may be controlled by replacing the transformation matrix stored in the printer with a transformation matrix specific to each page prior to printing the corresponding page. Therefore, before each page description is sent to the printer, a corresponding page matrix is installed into printer 12 having components for causing the page to be scaled to fit into a grid area, translated into the position of the current grid area, and rotated to correspond to the appropriate orientation in the grid area.

The components of the transformation matricies specific to each page will be the same for each page of multiple pages being printed on a single sheet, except the translation component which positions the pages will vary to correspond to the position of each page in the corresponding grid area of the grid configuration. The resulting matrix instructs the print engine where on the sheet to print the page image After that page image is printed another transformation matrix is installed to position a successive page on the same sheet. Preferably, these replacement transformation matricies are arranged in a single array for installation into printer 12 according to the page order set for the sheet.

Pages are printed on a sheet in this manner until the end of the print data file. At this time symbiont 28 sends down a device control library module from device control library 30 for printer 12 to eject the sheet.

It will be apparent to those skilled in the art that various modifications and variations can be made to the apparatus for and method of printing a predetermined number of pages on single sheet without departing from the scope or spirit of the invention such as utilizing a photographic typesetter, LED printer or ink jet for print engine 16. Thus it is intended the present invention cover the modifications and variations of this invention provided they come within the scope of the appended claims and their equivalents.

What is claimed is:

1. A method for printing a plurality of pages at corresponding, respective positions on a single sheet by a printer, each of said plurality of pages being represented by a page description specifying an image within a coordinate system of the page being represented, said method comprising the steps of:

computing the area on said sheet available for printing;

selecting a test number of pages equal to a predetermined number of pages;

determining at least one grid configuration, each of said configurations defining a given number of grid areas for printing pages therein and covering a percentage of the surface area of said sheet, said given number of grid areas having a value equal to said test number of pages;

calculating scale factors to establish the size of a page to be printed from one of said page descriptions as the size of one of said grid areas in each of said at least one of said grid configurations;

determining the grid configuration having a largest scale factor;

calculating, using the grid configuration having the largest scale factor, a percent surface area of the sheet covered by a number of grid areas equal to said test number of pages;

comparing said percent surface area to a predetermined percentage;

incrementing said test number of pages and repeating said steps of determining at least one grid configuration, calculating scale factors, determining the grid configuration having the largest scale factor, calculating percent surface area, and comparing the percent surface area covered to said predetermined percentage, said incrementing and repeating step being executed when said percent surface area has a value less than said predetermined percentage; and printing, in response to said percent surface area having a value equal to or greater than said predetermined percentage, a plurality of pages on said sheet using said largest scale factor.

2. A method according to claim 1 wherein said printing step further comprises the substeps of:

utilizing a transformation matrix in said printer to transform said coordinate system of said page descriptions to a printer dependent coordinate system; and installing a new transformation matrix in said printer, for every page to be printed on said sheet, said matrices having components corresponding to respective pages, said components causing the substeps of:

rotating corresponding pages to fit into a grid area when printed;

scaling corresponding pages by said largest scale factor; and translating corresponding pages to grid areas corresponding to said corresponding, respective positions of each of said pages on said sheet.

3. A method according to claim 2 wherein said step of printing further includes the substep of alternating margin positions from one edge of a sheet to an opposite edge of the surface of a successive sheet.

4. A method according to claim 1 wherein said computing step includes the substep of subtracting a surface area of said sheet occupied by margins from a total surface area available on said sheet for printing.

5. A method according to claim 1 wherein said step of determining a plurality of grid configurations includes the substeps of factoring said test number into pairs of factors and using the positive whole number factors as designations of the number of grid areas on adjacent sides of a grid configuration.

6. A method according to claim 1 wherein said step of determining a plurality of grid configurations includes the substep of establishing each grid configuration with said grid areas having equal areas.

7. A method according to claim 1 wherein said step of printing a plurality of pages includes the substep of printing a number of pages less than said predetermined number.

8. A method according to claim 1 wherein said sheet has a predefined orientation having a horizontal direction and a vertical direction and wherein said step of printing a plurality of pages further includes the substep of determining a sequence of pages printed relative to the orientation of the sheet.

9. A method according to claim 8 wherein said substep of determining the order of the pages printed includes the substeps of:

determining whether the pages are printed from the bottom to the top;

determining whether the pages are printed from the right to the left; and determining whether the pages are first printed in the horizontal direction.

10. A method according to claim 1 wherein said step of printing further includes the substep of selecting a first grid area in which to start printing pages.

11. A method according to claim 1 wherein said step of printing a plurality of pages includes the substep of printing a plurality of pages equal to said predetermined number.

12. An apparatus for printing a plurality of pages on a single sheet comprising:

means for generating pages in a page description format;

means for transmitting a print request;

means, coupled to said transmitting means, for scheduling said transmitted print request;

means, responsive to said print request and data representing said pages in a page description format, for printing said pages on a sheet;

means, coupled to said generating means, for storing said pages in response to said generating means, means, coupled to said printing means, said scheduling means, and said storing means, for determining at least one grid configuration, each of said grid configurations defining a plurality of grid areas for printing pages therein, for calculating scale factors to establish the size of a page to be printed from one of said page descriptions to fit in one of said grid areas in each of said grid configurations, and for determining one of said grid configurations having a percent coverage of surface area of said sheet greater than a predetermined percentage;

means, coupled to said means for determining at least one grid configuration, for generating instructions for printing the plurality of pages in corresponding grid areas of said grid configuration having a percent coverage of surface area of said sheet greater than a predetermined percentage; and said printing means including means for interpreting said instructions and for printing a plurality of pages on the single sheet in response to said interpreting means.

* * * * *